H. H. EDGE.
VALVE.
APPLICATION FILED NOV. 9, 1916.
1,313,858.
Patented Aug. 19, 1919.
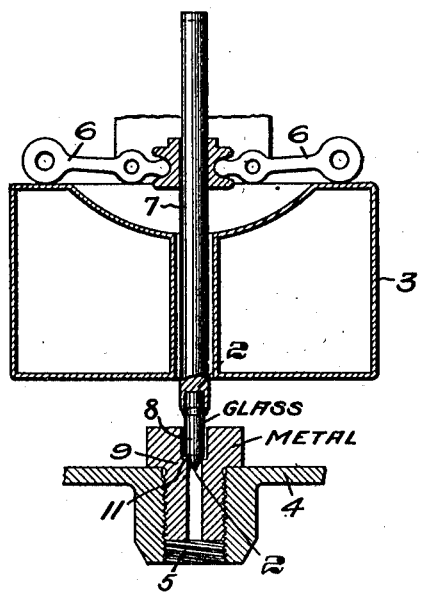
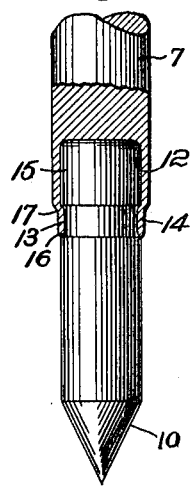
Inventor:
Howard H. Edge,
by Emery Booth Janney Varney
Attys.

UNITED STATES PATENT OFFICE.

HOWARD H. EDGE, OF BRIDGEPORT, CONNECTICUT, ASSIGNOR TO THE LOCOMOBILE COMPANY OF AMERICA, OF BRIDGEPORT, CONNECTICUT, A CORPORATION OF WEST VIRGINIA.

VALVE.

1,313,858. Specification of Letters Patent. Patented Aug. 19, 1919.

Application filed November 9, 1916. Serial No. 130,473.

*To all whom it may concern:*

Be it known that I, HOWARD H. EDGE, a citizen of the United States, and a resident of Bridgeport, county of Fairfield, and State of Connecticut, have invented an Improvement in Valves, of which the following description, in connection with the accompanying drawings, is a specification, like characters on the drawings representing like parts.

This invention relates to valves, and is more especially, though not exclusively, concerned with carbureter float valves for controlling the flow of liquid fuel to the float chamber of the carbureter.

My invention will be best understood by reference to the following description, when taken in connection with the accompanying drawings showing one specific embodiment thereof, while its scope will be more particularly pointed out in the appended claims.

In the drawings:

Figure 1 is a central, vertical sectional view, partly in elevation of a portion of a carbureter equipped with a valve embodying my invention; and Fig. 2 is a detail sectional view on a much enlarged scale similar to a portion of Fig. 1 and illustrating the means of attachment of the valve to its stem.

Referring to the drawings, and to the embodiment of my invention which is illustrated therein, I have there shown a portion of a carbureter whose general characteristics are of common form, the same comprising a float 3 working in a float chamber (not shown), the bottom of which is partially indicated and designated by the numeral 4, and has an inlet 5 for the liquid fuel. The float 3 acts through a pair of levers 6 to control the up and down movements of a valve stem 7, the latter passing axially through the float. The valve stem 7 carries a valve 8 coöperating with a valve seat 9 to control the flow of liquid fuel to the float chamber.

Heretofore, it has been customary to provide carbureters with metallic valves and valve seats, and it has been found through many years of experience with them that they wear to a considerable extent at the point where the valve contacts with the seat. This wear is probably due to one or more causes, among them being the continual striking of the valve against its seat as it opens and closes, and the erosion due to the flow of the liquid fuel through the restricted opening provided by the valve seat and valve, when the latter is lifted. Difficulty has also been experienced with such valves, due to corrosion, such difficulties as these impairing the accuracy of the carbureter and producing more or less faulty action requiring change of adjustment or renewal of parts to correct the difficulty.

I have discovered that all these difficulties can be obviated by the use of a valve and valve seat, at least one of which is composed of a suitable non-metallic mineral substance or lapideous material having a dense and non-corrodible nature. This density must be sufficient to prevent the leakage of gases or liquids through its pores, and it must be sufficiently hard to resist the wear to which it is subjected when in action. Among the substances which have the desired properties for the purpose are glass, glazed or vitreous material, porcelain, and semi-precious stones. Among the latter may be named agate, rock crystal, garnets, tourmalins and aquamarines. At least some, if not all, of these substances are silicious, that is to say, they contain or resemble silica, or have its general character to a greater or less extent.

Glass, being a substance resulting from the fusion of the combination of silica with various bases, is well adapted to the purpose, and I have found from experience that it resists wear and corrosive action very satisfactorily, especially when the valve itself is composed of glass and the valve seat of some suitable metal such as brass or brass composition. In the illustrated form or embodiment of my invention, the valve 8 consists of a cylindrical rod provided with a tapered annular surface 10, preferably conical in form, which constitutes its seating portion. This surface is given the proper angle and finish, preferably by grinding the same, this having been found to produce a smooth, accurate bearing surface. Before the valve is thus ground, however, it should first be annealed to prevent it from being too brittle. Coöperating with the described valve surface is the valve seat 9, preferably provided with a sharp-edged, or angular annular contacting portion, 11, whose sharp edge has line contact only with the valve.

The valve seat, being of metal such as brass, and softer than the valve, the softer material will always conform to the shape of the harder material and form a non-leakable joint. This is highly important in the control of gasolene and other similar hydro-carbons, which will frequently leak through a place where water will not. I have found that, by the combination of the metallic seat and the described non-metallic mineral valve, there is provided a valve structure which is far more enduring than carbureter valve structures heretofore in use.

The valve may be secured to its stem, the latter preferably composed of metal, in any other suitable manner, but herein the stem is provided with a recess 12, having a generally cup-like form, to receive the upper end of the glass rod which constitutes the valve, the latter being provided with an annular groove 13, into which the surrounding annular wall 14 of the cup-like inclosure is forced in some suitable manner, as by the use of swaging dies, or by spinning it to reduce its diameter, until it snugly fits the neck formed by the annular groove 13, and thus confines the head 15 above said neck within said chamber. By this means, the valve is permanently and securely held in the valve stem, and accurately centered with relation thereto, yet without the use of separate fastening elements. Preferably, the corners 16 and 17 of the annular groove 13 are rounded, or filleted, as shown, to avoid any possibility of danger of the valve cracking off at either of these points.

While I have herein shown and described one specific embodiment of my invention for illustrative purposes and have disclosed and discussed in detail the construction and arrangement incidental to one specific application thereof, it is to be understood that the invention is limited neither to the mere details or relative arrangement of parts, nor to its specific embodiment herein shown, but that extensive deviations from the illustrated form or embodiment of the invention may be made, without departing from the principles thereof.

Having thus described my invention, what I claim and desire by Letters Patent to secure is:

1. A valve having a port presenting an annular dihedral seat of soft metal and a coöperating valve of dense, non-corrodible lapideous material having a tapered end adapted to enter the port through said seat whereby to provide a permanently fitting line contact with the same.

2. The combination of a non-metallic mineral valve and a valve-stem therefor, said valve being provided with a head and a neck, and said valve-stem being provided with a cup-like recess snugly to receive said head, and an integral annular wall embracing said neck and retaining said head in said recess.

3. The combination of a non-metallic mineral valve and a valve-stem therefor, said valve being provided with an annular groove, and said valve-stem being provided with a cup-like recess in which a portion of said valve is fitted, and an annular wall fitted within said annular groove and holding said valve in said recess.

In testimony whereof, I have signed my name to this specification.

HOWARD H. EDGE.